United States Patent
Han et al.

(10) Patent No.: US 8,050,685 B2
(45) Date of Patent: Nov. 1, 2011

(54) APPARATUS AND METHOD FOR ALLOCATING UPLINK RADIO RESOURCE IN WIDEBAND WIRELESS COMMUNICATION SYSTEM

(75) Inventors: Ki-Young Han, Yongin-si (KR); Jae-Woo So, Boocheon-si (KR); Yong-Seok Kim, Suwon-si (KR); Sang-Wook Kwon, Daegu (KR); Ji-Hyun Park, Seoul (KR); Chi-Sung Bae, Andong-si (KR); Dong-Ho Cho, Seoul (KR); Oh-Hyun Jo, Cheongju-si (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 869 days.

(21) Appl. No.: 12/072,407

(22) Filed: Feb. 26, 2008

(65) Prior Publication Data

US 2008/0207214 A1 Aug. 28, 2008

(30) Foreign Application Priority Data

Feb. 26, 2007 (KR) .................. 10-2007-0018929

(51) Int. Cl.
*H04W 72/00* (2009.01)
(52) U.S. Cl. .............. 455/450; 455/452.2; 455/464; 455/509; 370/315; 370/412; 370/413; 370/414; 370/415; 370/416; 370/417; 370/429
(58) Field of Classification Search .......... 370/315, 370/412–417, 429; 455/452.2, 464, 509
See application file for complete search history.

(56) References Cited

U.S. PATENT DOCUMENTS

| | | | | |
|---|---|---|---|---|
| 5,737,330 A * | 4/1998 | Fulthorp et al. | ............... | 370/346 |
| 6,295,302 B1 * | 9/2001 | Hellwig et al. | ............... | 370/522 |
| 7,689,221 B1 * | 3/2010 | Gazzard | .................. | 455/437 |
| 2003/0133457 A1 * | 7/2003 | Ono et al. | ............... | 370/395.4 |
| 2006/0039333 A1 * | 2/2006 | Pirzada et al. | ............... | 370/338 |
| 2006/0046647 A1 * | 3/2006 | Parikh et al. | ................ | 455/11.1 |
| 2006/0153132 A1 * | 7/2006 | Saito | ....................... | 370/329 |
| 2007/0155391 A1 * | 7/2007 | Kang et al. | ................ | 455/450 |
| 2007/0189256 A1 * | 8/2007 | Oh | ............................. | 370/338 |
| 2007/0212069 A1 * | 9/2007 | Heinz et al. | .................. | 398/58 |
| 2008/0043815 A1 * | 2/2008 | Hart et al. | .................... | 375/135 |

FOREIGN PATENT DOCUMENTS

KR 1020030074197 A 9/2003

OTHER PUBLICATIONS

Office Action dated Feb. 26, 2010 in connection with Korean Patent Application No. 10-2007-0018929.

* cited by examiner

*Primary Examiner* — Kamran Afshar
*Assistant Examiner* — Edward Zhang

(57) ABSTRACT

An apparatus and method for UpLink (UL) radio resource allocation in a wideband wireless communication system are provided. In a method of operating a Relay Station (RS) for UpLink (UL) radio resource allocation in a wideband wireless communication system, the method includes relaying to a Base Station (BS) a resource request message of at least one or more Mobile Stations (MSs); receiving data from the at least one or more mobile stations; if the received data is non-real time traffic, queuing the data received from the mobile stations according to a traffic type; and requesting the base station to allocate necessary radio resources by checking a queue status. Accordingly, a delay can be reduced when the UL resource is allocated to an relay station for real time traffic.

20 Claims, 15 Drawing Sheets

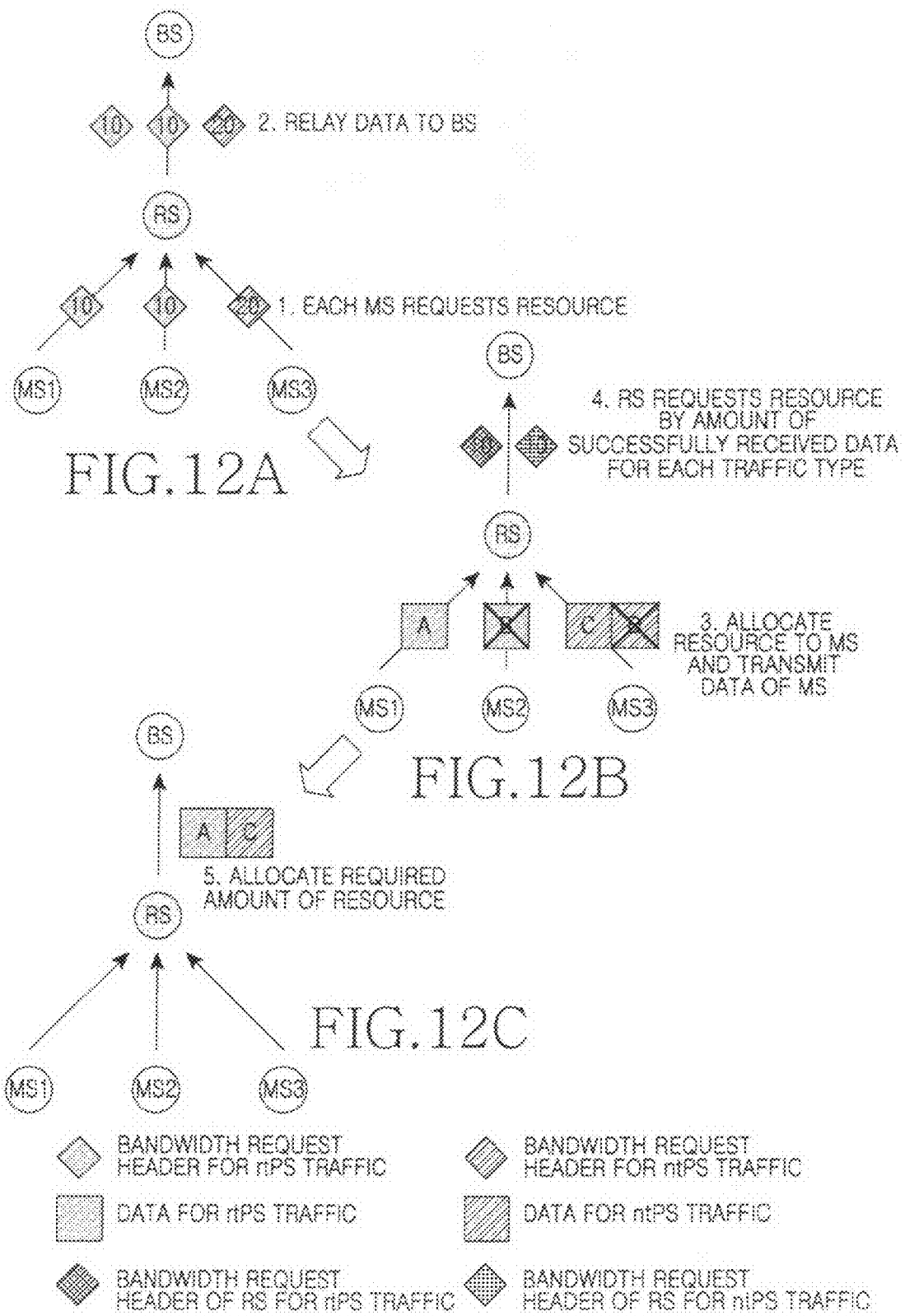

APPARATUS AND METHOD FOR ALLOCATING UPLINK RADIO RESOURCE IN WIDEBAND WIRELESS COMMUNICATION SYSTEM

CROSS-REFERENCE TO RELATED APPLICATION(S) AND CLAIM OF PRIORITY

This application claims priority under 35 U.S.C. §119(a) to a Korean patent application filed in the Korean Intellectual Property Office on Feb. 26, 2007 and assigned Serial No. 2007-18929, the entire disclosure of which is hereby incorporated by reference.

TECHNICAL FIELD OF THE INVENTION

The present invention relates to an apparatus and method for allocating radio resources in a wideband wireless communication system. More particularly, the present invention relates to an apparatus and method for allocating UpLink (UL) radio resources for multi-hop communications in a wideband wireless communication system.

BACKGROUND OF THE INVENTION

A radio access technique using a multi-hop scheme is necessary in mobile communication systems to increase a data transfer rate and to expand coverage. In the multi-hop scheme, a relay station (RS) is used to increase the data transfer rate and to expend the coverage at a low cost. In order to relay data of mobile stations through a radio link, resources must be allocated to the relay station by a base station (BS). In a resource allocation process, the resources are allocated in an adaptive manner according to a service traffic type, so that, for real time traffic, Quality of Service (QoS) is ensured by minimizing a delay, and for non-real time traffic, waste of resources is minimized to increase effectiveness of the resources.

In a conventional Institute of Electrical and Electronics Engineers (IEEE) 802.16 wideband wireless communication system, the mobile stations request the base station to allocate necessary resources by using different UpLink (UL) scheduling methods according to a service type. A Tunnel Connection IDentifier (T-CID) is assigned to each mobile station, and is used to identify services and to determine a UL scheduling method according to a QoS level of each service. Herein, resources are requested for each service. Examples of the scheduling method include Unsolicited Grant Service (UGS), real-time Polling Service (rtPS), non-real-time Polling Service (nrtPS), and Best Effort (BE), which are defined in an IEEE 802.16 system, and also include extended-real-time Polling Service (ertPS) which is newly defined in an IEEE 802.16e system. In all scheduling methods except for the UGS, each mobile station transmits a bandwidth request header. Then, the base station creates a UL-MAP by using the bandwidth request header, and allocates a necessary amount of resources to the mobile stations. When using the UGS, once a service connection is established, a predetermined amount of resources are periodically allocated without a particular resource request.

However, there is no scheduling method for allocating radio resources for multi-hop communications in a currently used wideband wireless communication system. When using a UL scheduling method used in a conventional multi-hop scheme, a specific mobile station, which directly communicates with a base station, operates in the same manner as in the conventional scheme. Other mobile stations, which communicate with the base station via the relay station, also operate in the same manner after recognizing the relay station as the base station. In order to perform UL relay transmission, resources must be allocated by the base station not only to the mobile stations but also to the relay station. Similarly to other mobile stations, when the relay station requests resources for all service connections established between the base station and the relay station, the resources have to be separately requested for services of all of that mobile stations that communicate via the relay station, resulting in a significant complex process. In addition, overhead may occur due to transmission of an unnecessary message or a bandwidth request header.

Accordingly, there is a need for an apparatus and method for allocating UL radio resources for multi-hop communications in a wideband wireless communication system.

SUMMARY OF THE INVENTION

To address the above-discussed deficiencies of the prior art, it is a primary object to address at least the above-mentioned problems and/or disadvantages and to provide at least the advantages described below. Accordingly, an aspect of the present invention is to provide an apparatus and method for allocating radio resources in a wideband wireless communication system.

Another aspect of the present invention is to provide an apparatus and method for allocating UpLink (UL) radio resources for multi-hop communications in a wideband wireless communication system.

Another aspect of the present invention is to provide an apparatus and method for effectively allocating UL resources while satisfying Quality of Service (QoS) for multi-hop communications in a wideband wireless communication system.

According to an aspect of the present invention, a method of operating a relay station (RS) for UL radio resource allocation in a wideband wireless communication system is provided. The method includes relaying to a base station (BS) a resource request message of at least one or more mobile stations; receiving data from the at least one or more mobile stations; if the received data is non-real time traffic, queuing the data received from the mobile stations distinctively according to a traffic type; and requesting the base station to allocate necessary radio resources by checking a queue status.

According to another aspect of the present invention, a method of operating a base station for UL radio resource allocation in a wideband wireless communication system is provided. The method includes receiving from a relay station a resource request message of at least one or more mobile stations; receiving the resource request message, and if data is real time traffic, allocating the resources requested by the mobile stations to the mobile stations and the relay station; and receiving the real time traffic data by using the resources allocated to the relay station.

According to another aspect of the present invention, a method of operating a relay station for UL radio resource allocation in a wideband wireless communication system is provided. The method includes relaying to a base station a resource request message received from at least one or more mobile stations; receiving data from the mobile stations and then queuing the data distinctively according to a traffic type; and checking a queue status and requesting the base station to allocate necessary radio resources.

According to another aspect of the present invention, a method of operating a base station for UL radio resource allocation in a wideband wireless communication system is provided. The method includes receiving from a relay station a resource request message of at least one or more mobile stations; allocating requested resources to the mobile stations by using bandwidth request header information contained in the resource request message; receiving a resource request message of the relay station from the relay station when polling is performed; and allocating necessary resources to the relay station by using the resource request message of the relay station.

According to another aspect of the present invention, a method of operating a relay station for UL radio resource allocation in a wideband wireless communication system is provided. The method includes relaying to a base station a resource request message received from at least one or more mobile stations; and allocating, by the base station, radio resources to the relay station in the same amount as allocated to the mobile stations.

According to another aspect of the present invention, a method of operating a base station for UL radio resource allocation in a wideband wireless communication system is provided. The method includes receiving from a relay station a resource request message of at least one or more mobile stations; and allocating resources to the mobile stations and the relay station by using bandwidth request header information contained in the resource request message.

According to another aspect of the present invention, a relay station apparatus for UL radio resource allocation in a wideband wireless communication system is provided. The apparatus includes a controller for relaying to a base station a resource request message of (or received from) at least one or more mobile stations; a traffic classifier for queuing the data received from the mobile stations distinctively according to a traffic type if the received data is non-real time traffic; and a resource requester for requesting the base station to allocate necessary radio resources by checking a queue status.

According to another aspect of the present invention, a base station apparatus for UL radio resource allocation in a wideband wireless communication system is provided. The apparatus includes a controller for receiving from a relay station a resource request message of at least one or more mobile stations and for receiving real time traffic data by using resources allocated to the relay station; and a resource allocator for receiving the resource request message, and for allocating the resources requested by the mobile stations to the mobile stations and the relay station upon receiving the real time traffic data.

According to another aspect of the present invention, a relay station apparatus for UL radio resource allocation in a wideband wireless communication system is provided. The apparatus includes a controller for relaying to a base station a resource request message received from at least one or more mobile stations; a traffic classifier for receiving data from the mobile stations and then for queuing the data distinctively according to a traffic type; and a resource request for checking a queue status and for requesting the base station to allocate necessary radio resources.

According to another aspect of the present invention, a base station apparatus for UL radio resource allocation in a wideband wireless communication system is provided. The apparatus includes a controller for receiving from a relay station a resource request message of at least one or more mobile stations; and a resource allocator for allocating a requested resource to the mobile stations by using bandwidth request header information contained in the resource request message.

According to another aspect of the present invention, a relay station apparatus for UL radio resource allocation in a wideband wireless communication system is provided. The apparatus includes a controller for relaying to a base station a resource request message received from at least one or more mobile stations; and a resource allocator for allocating, by the base station, radio resources in the same amount as allocated to the mobile stations.

According to another aspect of the present invention, a base station apparatus for UL radio resource allocation in a wideband wireless communication system is provided. The apparatus includes a controller for receiving from a relay station a resource request message of at least one or more mobile stations; and a resource allocator for allocating resources to the mobile stations and the relay station by using bandwidth request header information contained in the resource request message.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 12A, 12B and 12C illustrate an example of UL radio resource allocation in a wideband wireless communication system according to a second embodiment of the present invention;

DETAILED DESCRIPTION OF THE INVENTION

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Hereinafter, an apparatus and method for UpLink (UL) radio resource allocation in a wideband wireless communication system supported by a Radio Station (RS) will be described.

Figure 1:
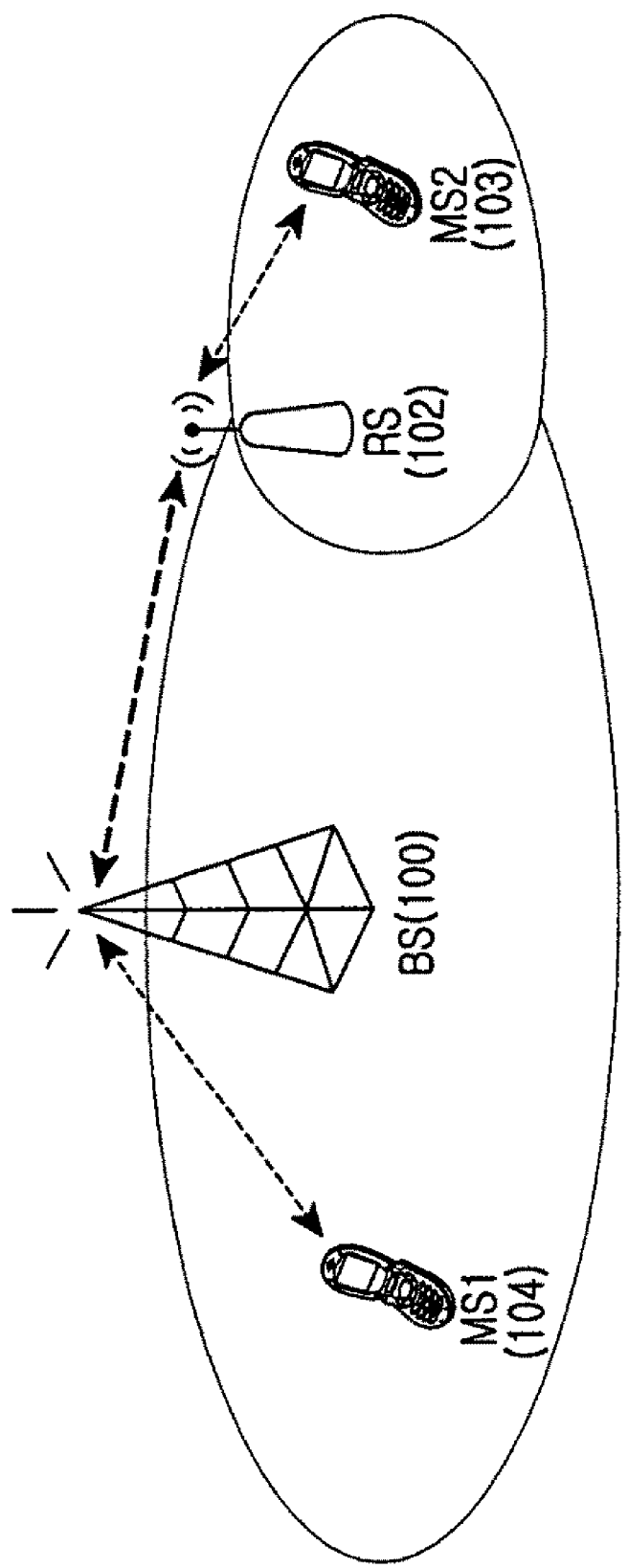
FIG. 1 illustrates a configuration of a wideband wireless communication system according to the present invention.

FIG. 1 illustrates a configuration of a wideband wireless communication system according to the present invention.

Referring to FIG. 1, the wideband wireless communication system includes a Base Station (BS) 100, a relay station 102, a Mobile Station (MS)1 104, and an MS2 103. Although the base station 100, the relay station 102, the MS1 104, and the MS2 103 are included in the system as an example for clear understanding, the present invention is not limited thereto. Thus, if necessary, the system may include more base stations, more relay stations, and more mobile stations.

The MS1 104 receives a service from the base station 100, and requests directly to the base station 100 to allocate resources. The MS2 103 communicates with the base station 100 via the relay station 102, and requests to the relay station 102 to allocate resources by recognizing the relay station 102 as the base station 100. In this case, the relay station 102 relays resource request information of the MS2 103 to the base station 100, so that the base station 100 can allocate the resources to the MS2 103. The Mobile stations 103 and 104 request the resources for each service traffic type. A Dynamic Service (DSx) message is used to determine a Quality of Service (QoS) parameter value and a scheduling method. Examples of the scheduling method include Unsolicited Grant Service (UGS), real-time Polling Service (rtPS), extended-real-time Polling Service (ertPS), non-real-time Polling Service (nrtPS), and Best Effort (BE) which are defined in the wideband wireless communication system.

When communicating with the MS2 103 located in a service area of the relay station 102, the relay station 102 acts as the base station 100. When communicating with the base station 100, the relay station 102 operates similarly to the MS2 103. In this case, by using a bandwidth request header, the MS2 103 located in the service area of the relay station 102 requests the base station 100 to allocate necessary resources. Upon receiving the bandwidth request header, the relay station 102 completely relays the bandwidth request header to the base station 100, so that resources to be used by the MS2 103 can be allocated by the base station 100. Since the relay station 102 operates similarly to the MS2 103 when the relay station 102 communicates with the base station 100, resources must be allocated to the relay station 102. The relay station 102 operates differently for a real time service and a non-real time service. In the case of the real time service, the relay station 102 simply relays the bandwidth request header transmitted by the MS2 103 to the base station 100 and does not request to the base station 100 to allocate resources to the relay station 102. The base station 100 allocates the resources to the relay station 102 by using the bandwidth request information of the mobile stations 103 and 104 for real time traffic. In the case of the non-real time service, when the mobile stations 103 and 104 transmit the bandwidth request information, the relay station 102 also relays the bandwidth request information to the base station 100. However, unlike in the real time traffic service in which the base station 100 allocates resources to the mobile station 103 and the relay station 102 by using the bandwidth request information, in the non-real time service, the base station 100 allocates resources only to the mobile stations by using the bandwidth request information of the mobile stations. After the resources are allocated, the mobile stations transmit data to the relay station 102, and the relay station 102 requests the base station 100 to allocate resources by an equal amount of successfully received data, thereby preventing waste of unnecessary resources.

Exemplary embodiments of a method of allocating UL radio resources in a multi-hop environment will hereinafter be described with reference to FIG. 2 to FIGS. 13A, 13B and 13C. In a first embodiment, bandwidth request information of mobile stations is used without a bandwidth request of a relay station. In a second embodiment, a relay station requests resources for transmitting UL data for each traffic type. In a third embodiment, a relay station requests resources according to a traffic type in an adaptive manner.

Figure 2:
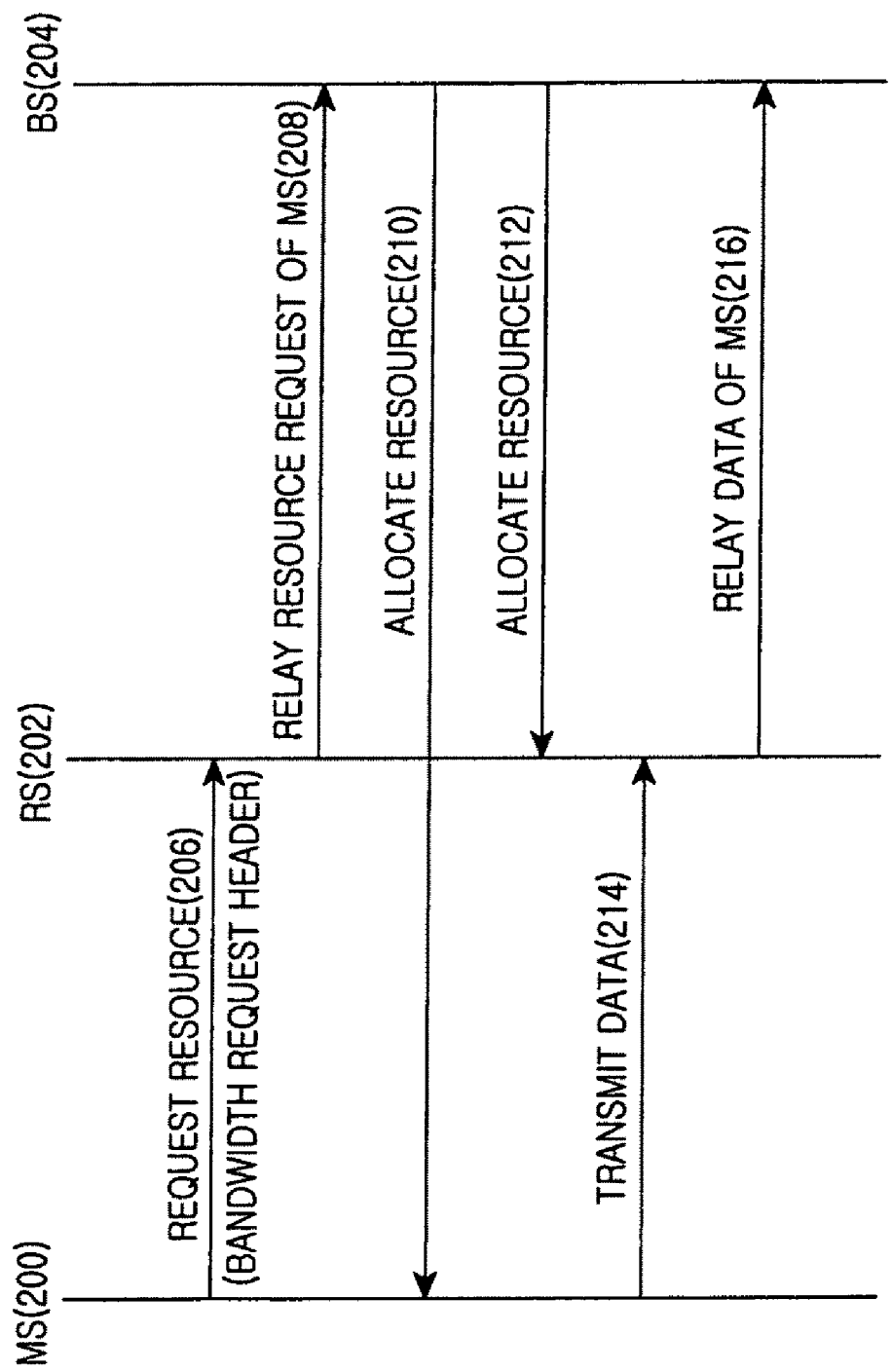
FIG. 2 is a signal flow diagram illustrating UpLink (UL) radio resource allocation in a wideband wireless communication system according to a first embodiment of the present invention.

FIG. 2 is a signal flow diagram illustrating UL radio resource allocation in a wideband wireless communication system according to the first embodiment of the present invention.

Referring to FIG. 2, in order to transmit UL data, a relay station 202 uses bandwidth request information which is transmitted to a base station 204 by one (or more) mobile station(s) 200 without an additional bandwidth request.

In step 206, in order to request the base station 204 to send UL data, the mobile station 200 transmits a bandwidth request header to the relay station 202. When using the UGS defined in an Institute of Electrical and Electronics Engineers (IEEE) 802.16 standard, a DSx message is used in a signaling process to determine an amount of periodically required resources and to allocate the resources without a bandwidth request.

In step 208, the relay station 202 relays the bandwidth request header of the mobile station 200 and a signaling message to the base station 204 in a multi-hop scenario.

In step 210, the base station 204 allocates resources to the mobile station 200 by using the bandwidth request header information which is transmitted from the mobile station 200 via the relay station 202. In step 212, the base station 204 allocates the resources to the relay station 202. In other words, the base station 204 can know an amount of UL data of the mobile station 200 by using information (i.e., the bandwidth request header and the DSx message) transmitted from the mobile station 200. Herein, the mobile station 200 receives relay service from the relay station 202 for each frame. The base station 204 calculates an amount of UL data of the mobile station 200, and then immediately allocates a necessary amount of resources to the relay station 202 with a resource request of the relay station 202. Accordingly, in a next frame, the relay station 202 can relay data received from the mobile station 200.

In step 214, the mobile station 200 transmits data by using the resources allocated by the base station 204.

In step 216, the relay station 202 relays the data received from the mobile station 200 to the base station 204.

Figure 3:
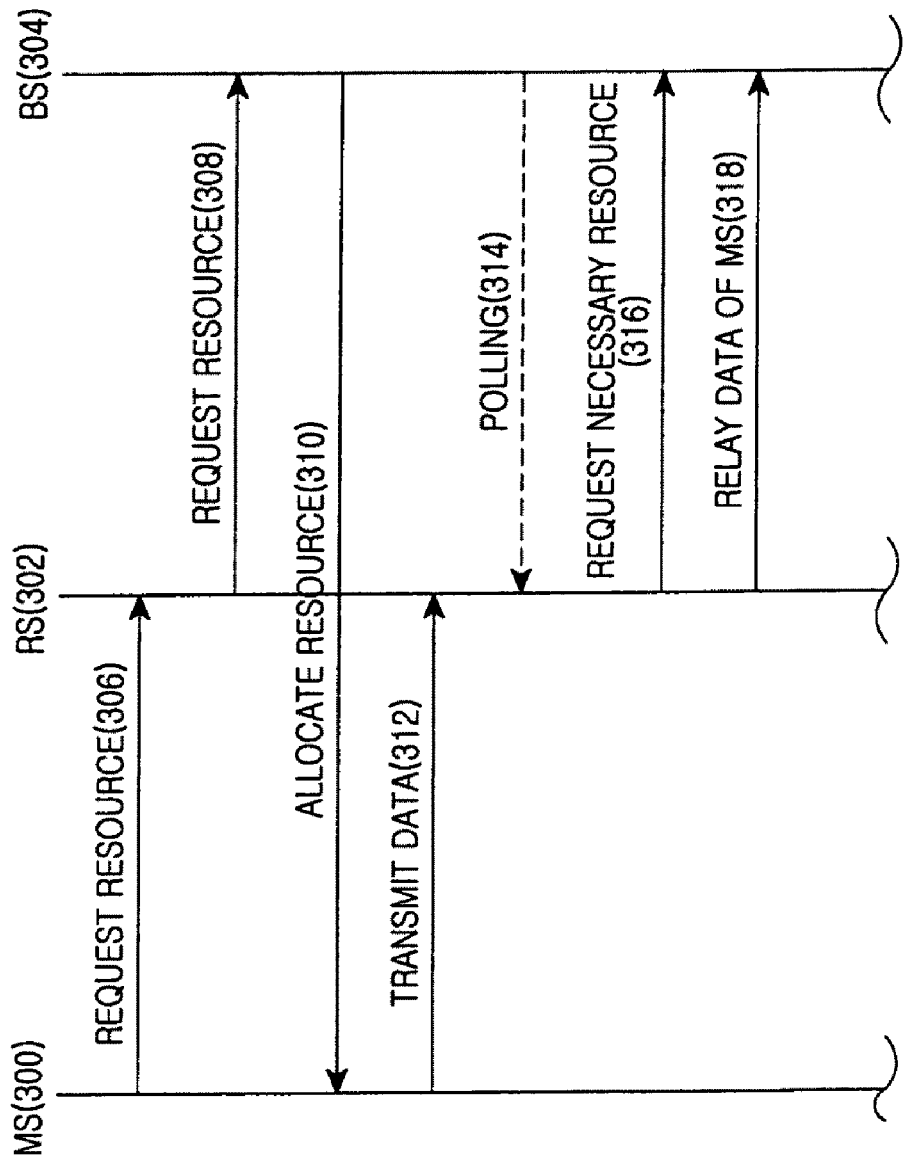
FIG. 3 is a signal flow diagram illustrating UL radio resource allocation in a wideband wireless communication system according to a second embodiment of the present invention.

FIG. 3 is a signal flow diagram illustrating UL radio resource allocation in a wideband wireless communication system according to the second embodiment of the present invention.

Referring to FIG. 3, a relay station 302 requests a base station 304 to allocate UL resources for each traffic type. There are five traffic types herein, namely, UGS, rtPS, ertPS, nrtPS, and BE. In a multi-hop scenario, since one (or more) mobile station(s) 300 operate in the same manner as in the conventional multi-hop scheme, the mobile station 300 requests resources by recognizing the relay station 302 as the base station 304. The base station 304 allocates the resources in a link between the relay station 302 and the mobile station 300 according to the resource request of the mobile station 300. The UL resources are allocated to the relay station 302 in a link between the base station 304 and the relay station 302 with an additional request of the relay station 302.

In step 306, the mobile station 300 transmits a bandwidth request header to the relay station 302 in order to request the base station 304 to send UL data.

In step 308, the relay station 302 relays the bandwidth request header of the mobile station 300 and a signaling message to the base station 304 in a multi-hop scenario. Similarly to the mobile station 300, resources are allocated to the relay station 302 by the base station 304 according to the five types of scheduling method. When the UGS is used, similarly to the operation of the mobile station 300, the bandwidth request header is not sent, and thus a DSx message transmitted by the mobile station 300 is used to negotiate with the base station 304, and thereafter a predetermined amount of resources is periodically and automatically allocated. When using other types of scheduling method except for the UGS, the bandwidth request header is sent as in the case of the mobile station 300. When mobile stations included in a service area of the relay station 302 transmit data, the relay station 302 queues the received data for each traffic type, and by considering the service traffic types as a set of service traffic types, the relay station 302 requests resources in the same manner as the mobile station 300. That is, it can be regarded that the relay station 302 always has five service traffic types. The relay station 302 calculates an amount of data successfully received from the mobile station 300, and requests a necessary amount of resources to the base station 304 by using the bandwidth request header.

In step 310, the base station 304 allocates resources to the mobile station 300 by using the bandwidth request header information which is transmitted from the mobile station 300 via the relay station 302. In a multi-hop scenario, when the mobile station 300, which receives a relay service from the relay station 302, transmits the bandwidth request header in order to request resources, the base station 304 first allocates resources between the relay station 302 and the mobile station 300 to the mobile station 300 so that the mobile station 300 can transmit data to the relay station 302.

In step 312, the mobile station 300 transmits data by using the resources allocated by the base station 304.

Thereafter, the relay station 302 queues data received from the mobile station 300 for each service traffic type. When an rtPS queue, an nrtPS queue, an ertPS queue, and a BE queue are provided to store successfully received data, and thus the data is stacked in each queue, then, by using polling performed in step 314, the relay station 302 transmits a bandwidth request header in step 316 to request the base station 304 to allocate necessary resources between the relay station 302 and the base station 304. For this, the relay station 302 has four queues, and also has a Connection IDentifier (CID) which is assigned to the relay station and is used in the bandwidth request header. In the case of the UGS, resources are automatically allocated as defined in a DCx message when a service starts or during the service is provided, without a resource request even in the conventional IEEE 802.16 standard. Therefore, a queue for the UGS is not provided. In the UGS, resources are periodically allocated as shown in FIG. 2 without a resource request of the relay station.

In step 318, the relay station 302 relays data, which is transmitted from the mobile station 300 and is stacked in a queue, by using resources allocated by the base station 304.

Figure 4:
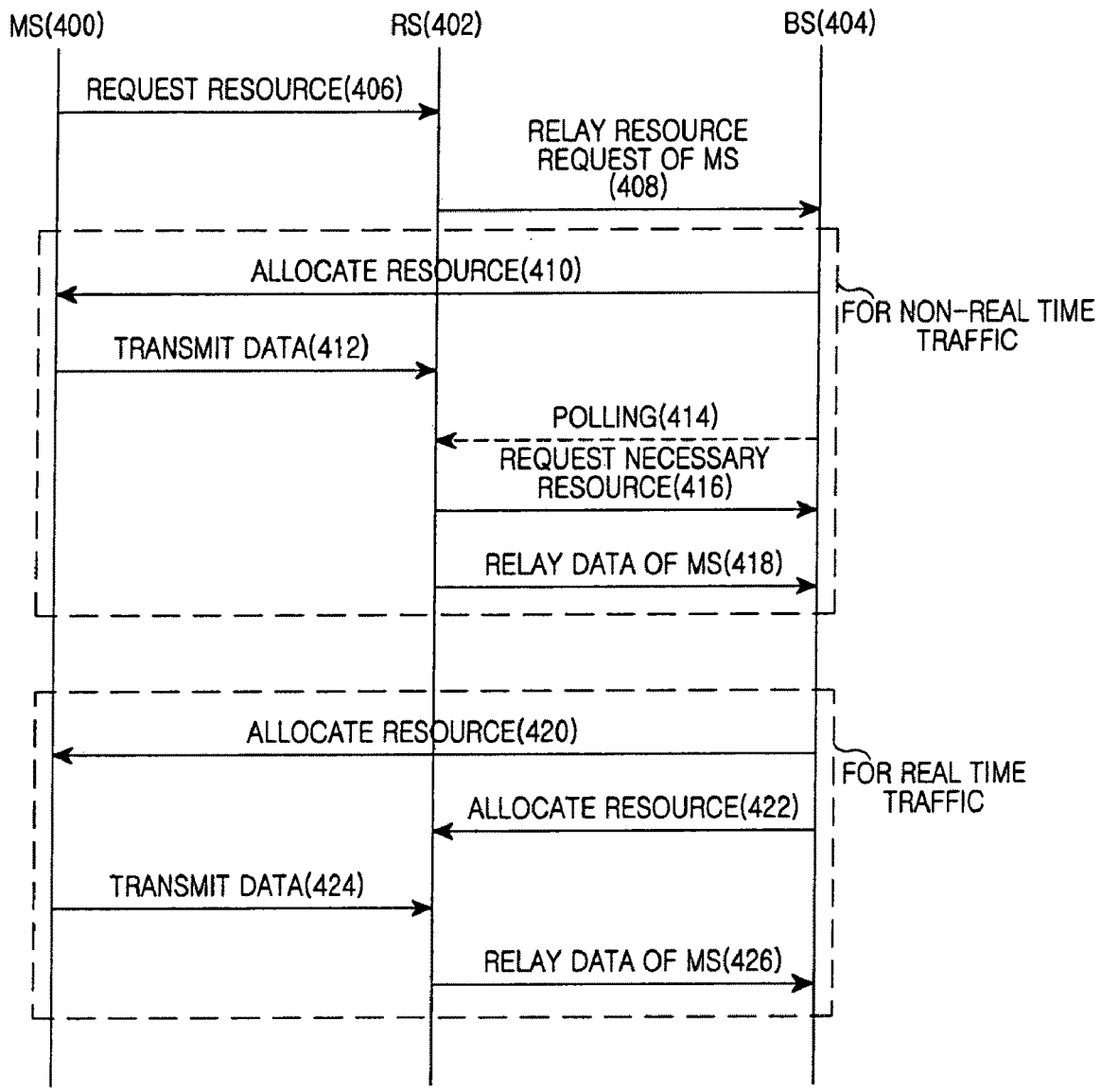
FIG. 4 is a signal flow diagram illustrating UL radio resource allocation in a wideband wireless communication system according to a third embodiment of the present invention.

FIG. 4 is a signal flow diagram illustrating UL radio resource allocation in a wideband wireless communication system according to the third embodiment of the present invention.

Referring to FIG. 4, a relay station 402 requests resources in an adaptive manner according to a traffic type, and a first method of FIG. 2 and a second method of FIG. 3 are combined in a third method of FIG. 4. That is, as for real time traffic, the first method of FIG. 2 is used to allocate resources to the relay station 402, and as for non-real time traffic, the second method of FIG. 3 is used to allocate resources to the relay station 402. In the first method, the relay station 402 estimates resources required for each frame by using bandwidth request information of one (or more) mobile station(s) 400 without having to perform a resource request process, and thus data can be transmitted with a minimum delay. Therefore, the first method is a suitable method for the real time traffic. However, although a delay can be minimized during a service is provided, the first method may cause waste of resources. For this reason, as for the non-real time traffic, in order to minimize the waste of resources even if a service delay may slightly occur, the second method is used to allocate the resources. In this case, the relay station 402 receives data transmitted by the mobile station 400, and then requests a base station 404 to allocate a successfully received amount of resources, thereby preventing waste of resources in comparison with the first method.

In the multi-hop scenario, when the mobile station 400 receives a relay service from the relay station 402 and transmits various types of data on UL transmission, the relay station 402 can know a service type of the mobile station 400. In the IEEE 802.16 standard, resource allocation for UL data transmission is not carried out for each mobile station 400 but carried out for each service traffic. Therefore, resources can be allocated to the relay station 402 in an adaptive manner according to a traffic type in order to relay UL data to the base station 404 when the mobile station 400 transmits the UL data. In the case of the UGS, the mobile station 400 does not transmit a bandwidth request header for a resource request. Instead, the mobile station 400 negotiates a period and amount of resource to be allocated by using a DSx message when an initial service starts or during a service is provided. In addition, since the UGS is real-time traffic, the relay station 402 does not request resources for relaying UGS service data. Instead, by using information on the DSx message transmitted by the mobile station 400 to the base station 404, the base station 404 allocates resources to the relay station 402, and thus the relay station 402 relays data. In order for the relay station 402 to be able to relay UGS service-type data, the base station 404 evaluates a UGS traffic amount and period of the mobile station 400 which receives a relay service from the relay station 402. Then, the base station 404 calculates a necessary amount of data for each frame, and allocates corresponding resources to the relay station 402. Therefore, while the relay station 402 receives data transmitted by the mobile station 400, resources through which data can transmitted to the base station 400 are allocated to the relay station 400. Accordingly, the relay station 402 relays the data to the base station 404 with a minimum delay.

When using the real-time traffic (e.g., rtPS or ertPS), the mobile station 400 periodically transmits the bandwidth request header at a predetermined period to request necessary resources in step 406. Therefore, as for the rtPS or ertPS service, when the mobile station 400 transmits the bandwidth request header, the relay station 402 relays the bandwidth request header in step 408, and does not additionally request resources for UL data transmission between the relay station 402 and the base station 404. The base station 404 gathers bandwidth request header information of the mobile station 400. When the base station 404 allocates resources to the mobile station 400 in step 420, the mobile station 400 transmits data to the relay station 402 by using the allocated resources in step 424. In step 422, the base station 404 calculates and allocates UL resources required by the relay station 402 at a time point when data is transmitted from the mobile station 400. As a result, in step 426, the relay station 402 can relay data of the mobile station 400 to the base station 404 without an additional resource request process.

On the other hand, when using the non-real time traffic (e.g., nrtPS or BE), the base station non-periodically performs polling in step 414, and thus, upon detecting data to be transmitted, the relay station 402 transmits the bandwidth request header in step 416. The relay station 402 relays to the base station 404 the bandwidth request header which has been transmitted in step 406 by the mobile station 400. According to the bandwidth request header, the base station 404 allocates resources to the mobile station 400 in step 410, and thus the mobile station 400 transmits data to the relay station 402 in step 412. In this case, the base station 404 does not allocate resources to the relay station 402 until a resource request is received from the relay station 402. For each traffic class (or type), the relay station 402 queues non-real time traffic data transmitted by the mobile station 400. In step 416, the relay station 402 transmits the bandwidth request header to the base station 404 in order to request resources when data is stacked in each queue. In this case, the base station 404 recognizes the relay station 402 similar to the mobile station 400, and thus the base station 404 non-periodically polls the relay station 402 when a cell of the base station 404 has sufficient resources. After the relay station 402 is polled, the relay station 402 requests the bandwidth request header through the UL resource request of the relay station 402 in the same manner as the mobile station 400 when data to be transmitted is stored in a queue. That is, the relay station 402 collectively recognizes all nrtPS services of the mobile station 400 as one service traffic, and requests the base station 404 to allocate resources by using the same nrtPS class. Likewise, the relay station 402 collectively recognizes all BE services as one service traffic, and requests the base station 404 to allocate resources by using the same BE class. When the relay station 402 requests the base station 404 to allocate the resources in this manner for the non-real time traffic, the relay station 402 requests the resources only for successfully received data, thereby preventing waste of resources. An additional delay may be produced when queuing is performed by the relay station 402. However, since the non-real time traffic has a characteristic in which a delay is permitted to some extent, there is a greater advantage in terms of resource savings. For this, the relay station 402 has two queues, and also has a CID which is assigned to the relay station and is used in the bandwidth request header between a relay station-base station link.

Figure 5:
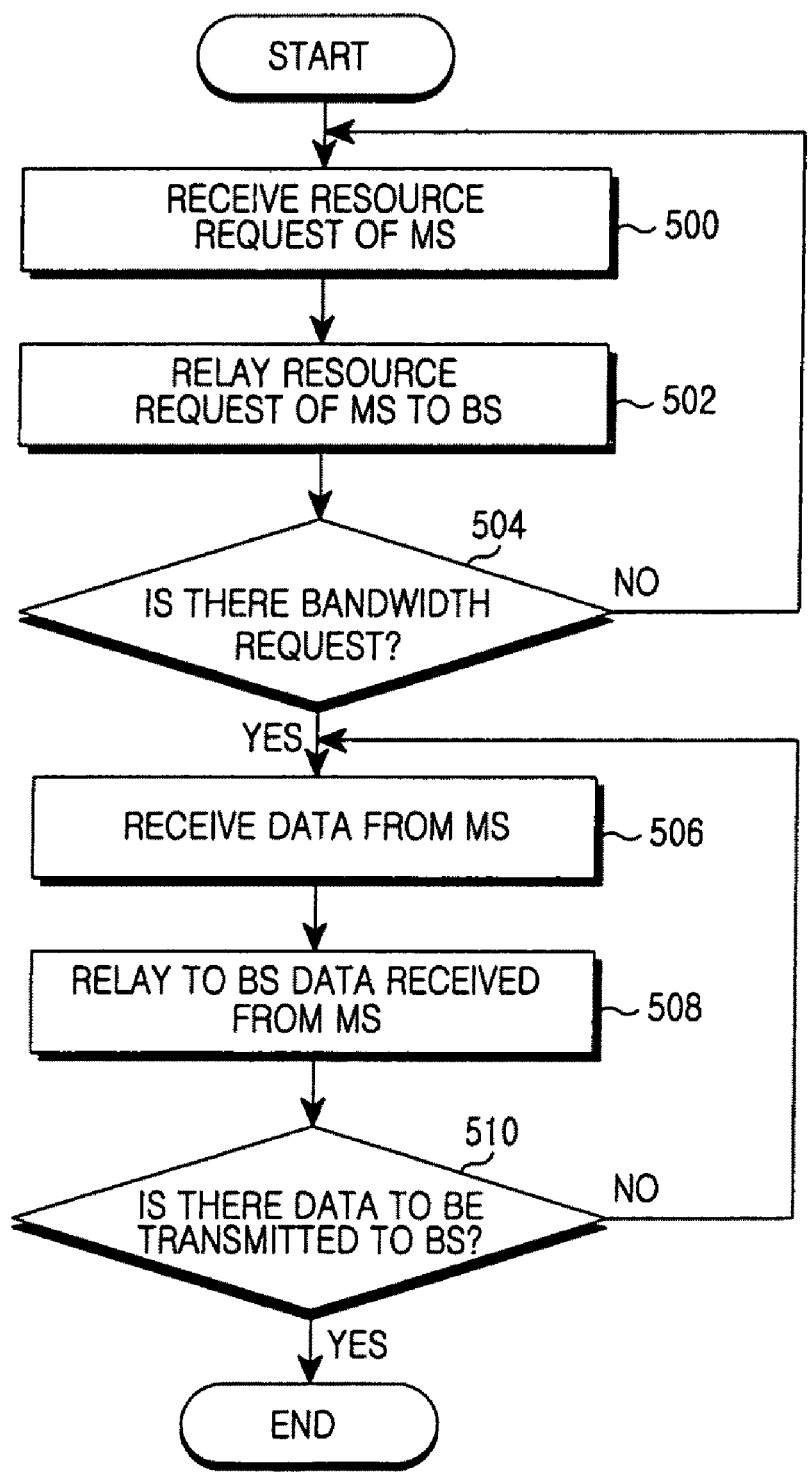
FIG. 5 is a flowchart illustrating an operation of a Relay Station (RS) for UL radio resource allocation in a wideband wireless communication system according to a first embodiment of the present invention.

FIG. 5 is a flowchart illustrating an operation of a relay station for UL radio resource allocation in a wideband wireless communication system according to the first embodiment of the present invention.

Referring to FIG. 5, the relay station receives a resource request message from a mobile station in step 500. A bandwidth request header is used in the resource request.

In step 502, the relay station relays to a base station the bandwidth request header of the mobile station and a signaling message.

In step 504, the relay station determines whether there is no bandwidth request. If there is a bandwidth request, the relay station receives data from the mobile station in step 506. Otherwise, if there is no bandwidth request, returning to step 500, the relay station receives the resource request message from the mobile station.

In step 508, the relay station relays to the base station the data received from the mobile station.

In step 510, the relay station determines whether there is no more data to be received, and if there is no more data to be received, returning to step 506, receives data from the mobile station.

Thereafter, the procedure of FIG. 5 ends.

Figure 6:
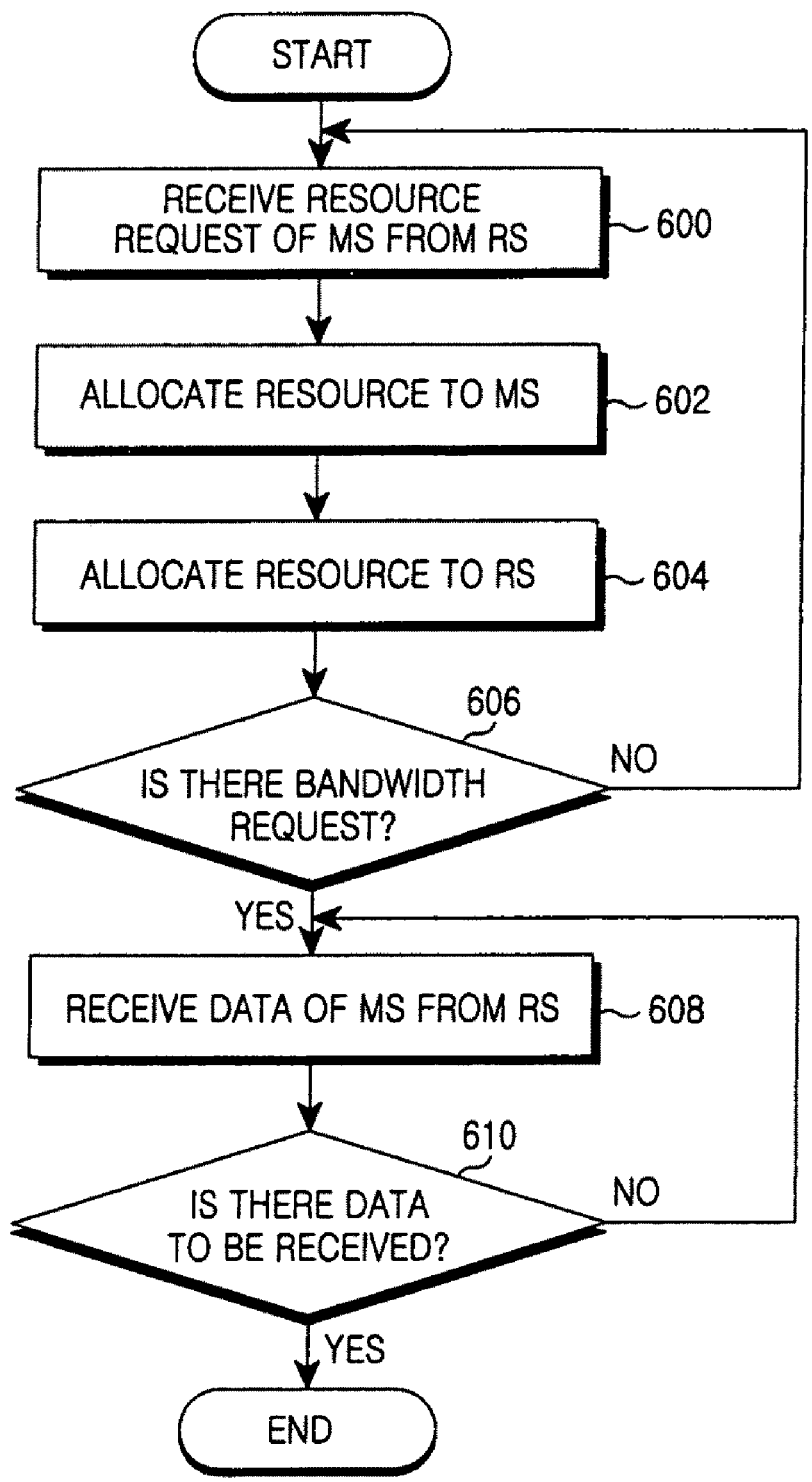
FIG. 6 is a flowchart illustrating an operation of a Base Station (BS) for UL radio resource allocation in a wideband wireless communication system according to a first embodiment of the present invention.

FIG. 6 is a flowchart illustrating an operation of a base station for UL radio resource allocation in a wideband wireless communication system according to the first embodiment of the present invention.

Referring to FIG. 6, the base station receives from a relay station a resource request message of a mobile station in step 600.

In step 602, the base station allocates to the mobile station a resource between a mobile station-relay station link by using bandwidth request header information contained in the resource request message.

In step 604, the base station allocates to the relay station a resource between a relay station-base station link by using the bandwidth request header information contained in the resource request message. In this case, the resource allocated to the relay station is equal to the resource allocated to the mobile station.

In step 606, the base station determines whether there is any bandwidth request, and if there is no bandwidth request, returning to step 600, receive from the relay station the resource request message of the mobile station. Otherwise, if there is a bandwidth request, proceeding to step 608, the base station receives from the relay station the data of mobile station.

In step 610, the base station determines whether there is more data to be received, and if there is no more data to be received, returning to step 608, receives from the relay station the data of mobile station.

Thereafter, the procedure of FIG. 6 ends.

Figure 7:
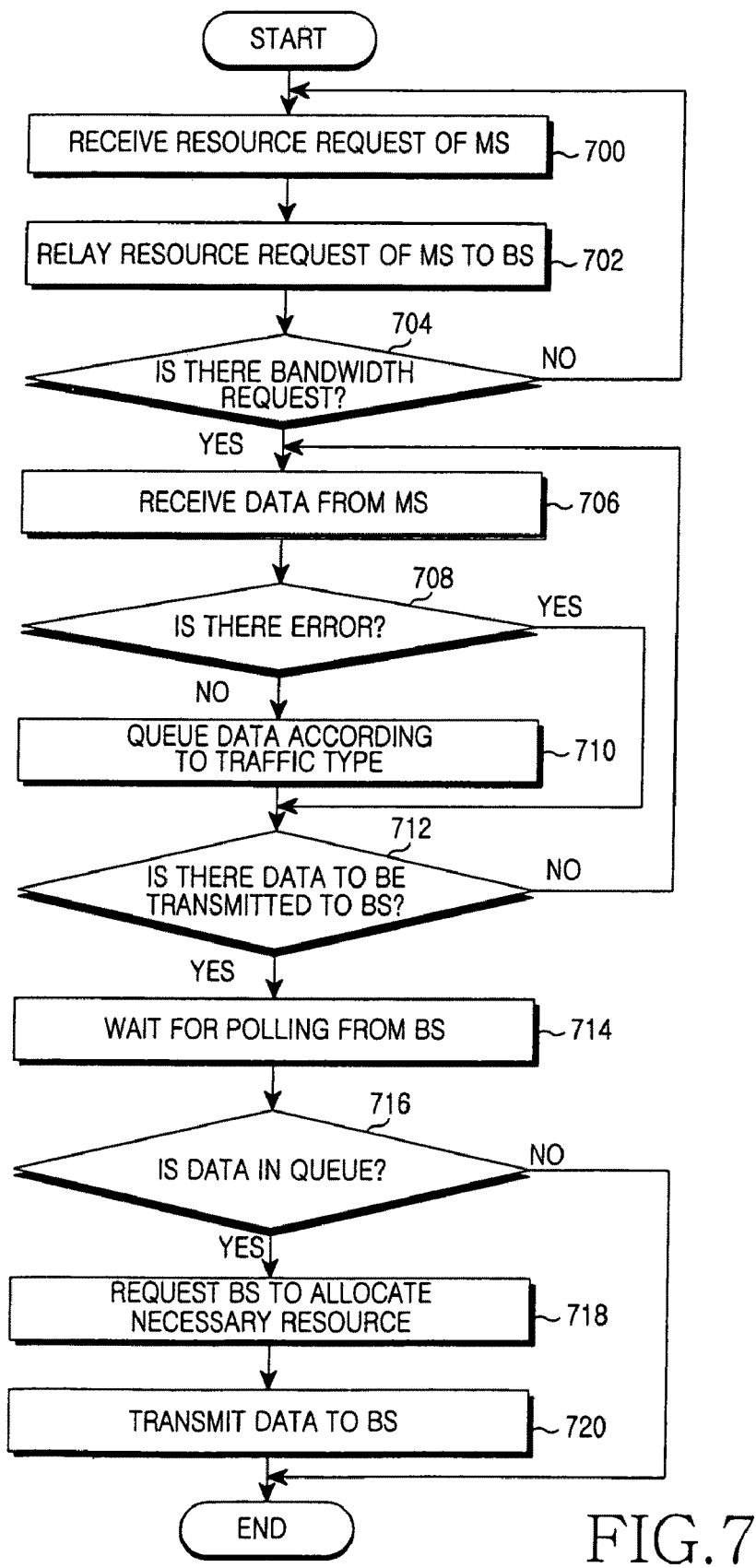
FIG. 7 is a flowchart illustrating an operation of a relay station for UL radio resource allocation in a wideband wireless communication system according to a second embodiment of the present invention.

FIG. 7 is a flowchart illustrating an operation of a relay station for UL radio resource allocation in a wideband wireless communication system according to the second embodiment of the present invention.

Referring to FIG. 7, the relay station receives a resource allocation message from a mobile station in step 700. A bandwidth request header is used in the resource request.

In step 702, the relay station relays to a base station the bandwidth request header of the mobile station and a signaling message.

In step 704, the relay station determines whether there is no bandwidth request, and if there is a bandwidth request, receives data from the mobile station in step 706. Otherwise, if there is any bandwidth request, returning to step 700, the relay station receives the resource request message from the mobile station.

In step 708, the relay station detects an error in data received from the mobile station. Upon detecting the error, proceeding to step 712, the relay station determines if there is any data to be transmitted to the base station. Otherwise, if no error is detected, the relay station queues data for each traffic type in step 710.

In step 714, the relay station waits to be polled by the base station. The polling is transmission control in which the base station continuously checks a status of the relay station or the mobile station.

In step 716, the relay station determines whether data is in a queue, and if the data is in the queue, the relay station verifies an amount of data currently remaining in the queue. Then, the relay station requests the base station to allocate necessary resources in step 718.

In step 720, the relay station relays to the base station the data received from the mobile station by using the allocated resources.

Thereafter, the procedure of FIG. 7 ends.

Figure 8:
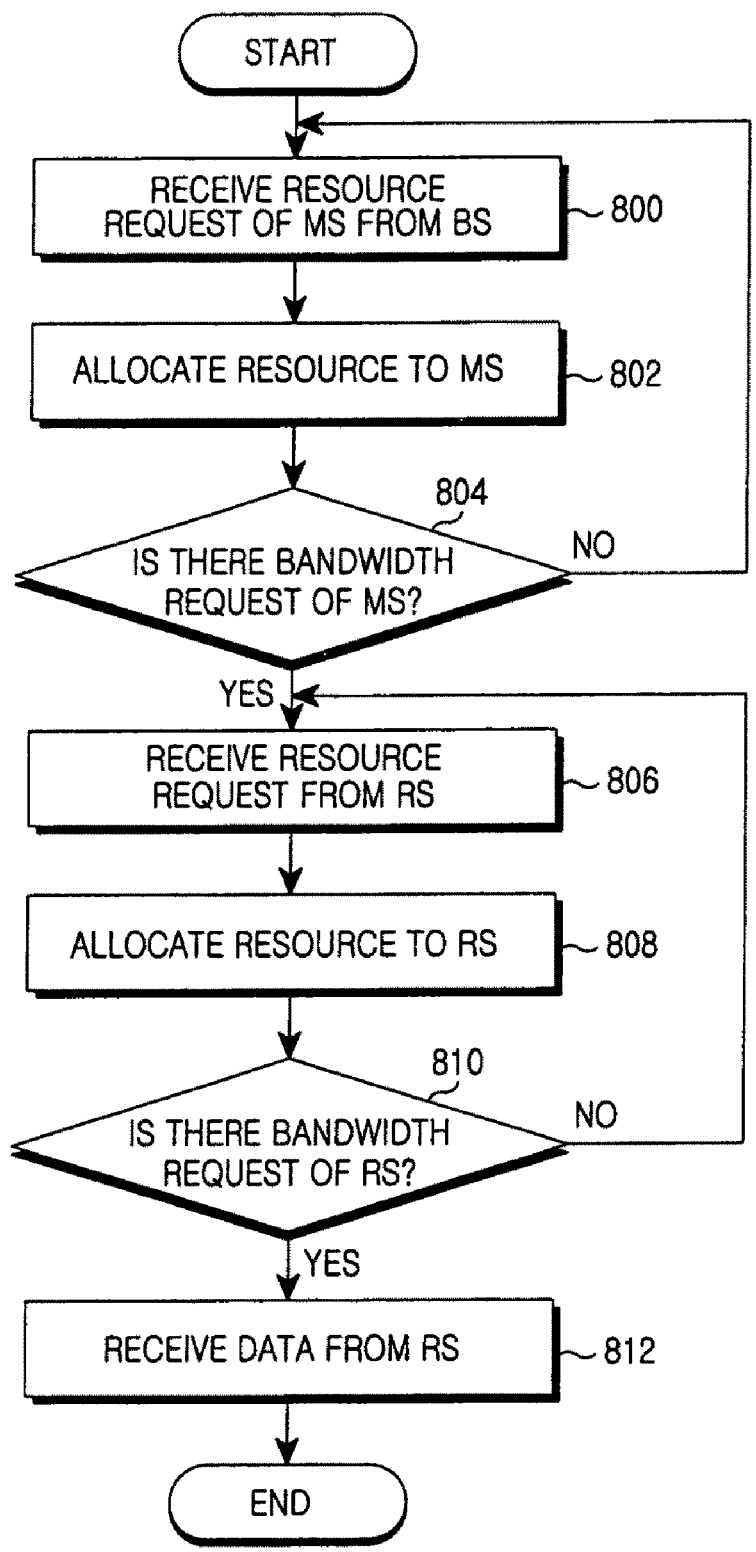
FIG. 8 is a flowchart illustrating an operation of a base station for UL radio resource allocation in a wideband wireless communication system according to a second embodiment of the present invention.

FIG. 8 is a flowchart illustrating an operation of a base station for UL radio resource allocation in a wideband wireless communication system according to the second embodiment of the present invention.

Referring to FIG. 8, the base station receives from a relay station a resource request message of a mobile station in step 800.

In step 802, the base station allocates to the mobile station a resource between a mobile station-relation station link by using bandwidth request header information contained in the resource request message.

In step 804, the base station determines whether there is any bandwidth request, and if there is no bandwidth request, returning to step 800, receives from the relay station the resource request message of the mobile station. Otherwise, if there is a bandwidth request, proceeding to step 806, the base station receives the resource allocation message from the relay station.

In step 808, the base station allocates to the relay station a resource requested by the relay station.

In step 810, the base station determines whether there is any bandwidth request of the relay station, and if there is no bandwidth request, the procedure returns to step 806. Otherwise, if there is a bandwidth request of the relay station, the base station receives the data of the mobile station from the relay station in step 812.

Thereafter, the procedure of FIG. 8 ends.

Figure 9:
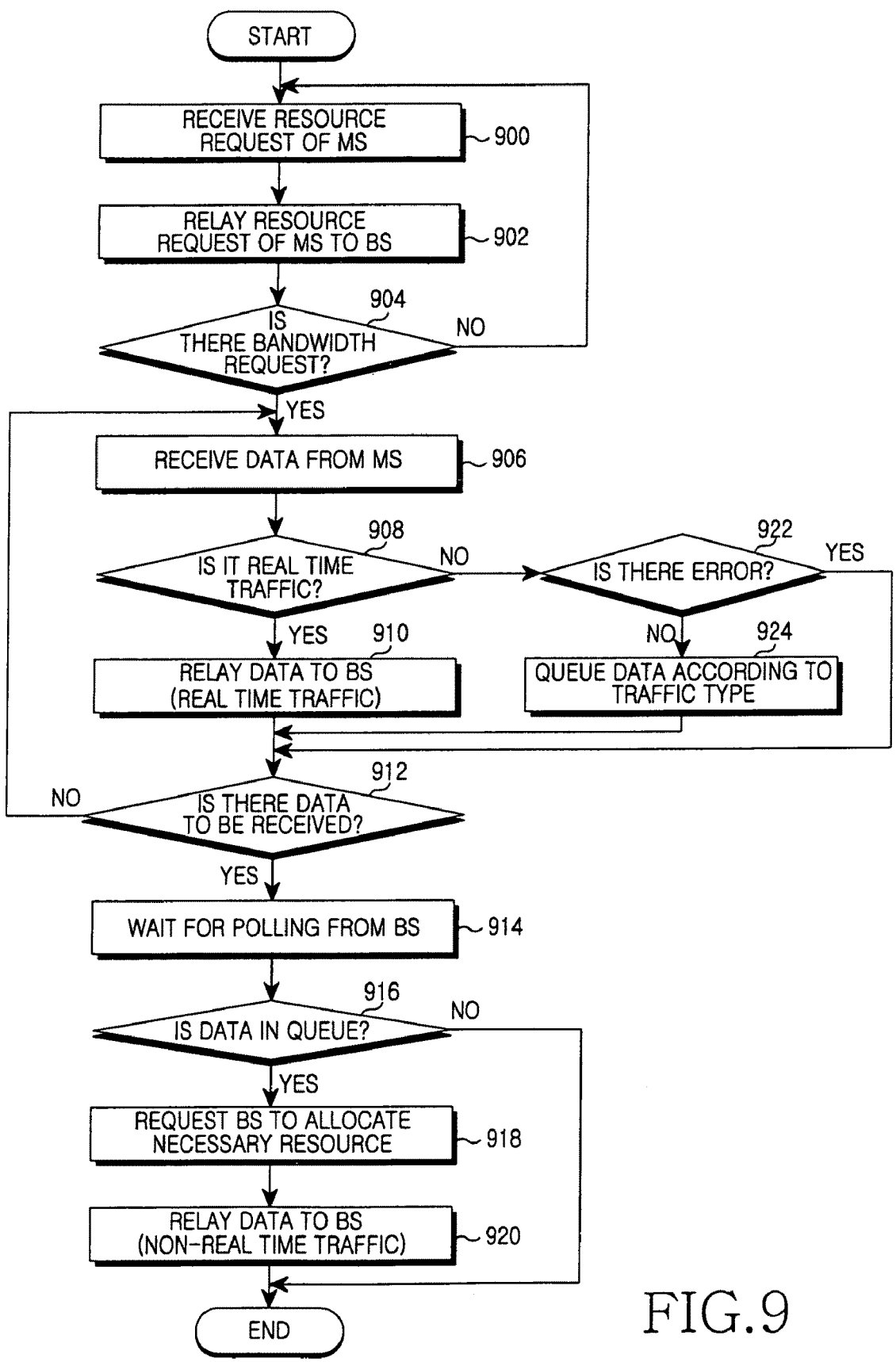
FIG. 9 is a flowchart illustrating an operation of a relay station for UL radio resource allocation in a wideband wireless communication system according to a third embodiment of the present invention.

FIG. 9 is a flowchart illustrating an operation of a relay station for UL radio resource allocation in a wideband wireless communication system according to the third embodiment of the present invention.

Referring to FIG. 9, the relay station receives a resource allocation message from a mobile station in step 900. A bandwidth request header is used in the resource request.

In step 902, the relay station relays to a base station the bandwidth request header of the mobile station and a signaling message.

In step 904, the relay station determines whether there is any bandwidth request. If there is a bandwidth request, the relay station receives data from the mobile station in step 906. Otherwise, if there is no bandwidth request, returning to step 900, the relay station receives the resource request message from the mobile station.

In step 908, the relay station determines whether the data received from the mobile station is real-time traffic. If the data is the real-time traffic, the relay station relays to the base station the received (real time traffic) data in step 910.

Otherwise, if the data is determined to be non-real time traffic in step 908, the relay station detects an error in the data received from the mobile station in step 922. Upon detecting the error, the procedure proceeds to step 912. Otherwise, if no error is detected, the relay station queues data for each traffic type in step 924.

In step 912, the relay station determines whether there is no more data to be received, If there is no more data to be received, the procedure returns to step 906. If there is more data to be received, the relay station waits to be polled by the base station in step 914.

In step 916, the relay station determines whether data is in a queue. If the data is in the queue, the relay station verifies a data amount currently remaining in the queue and requests the base station to allocate a necessary resource in step 918. If there is no data in the queue, the procedure of FIG. 9 ends.

In step 920, the relay station relays to the base station the (non-real time traffic) data received from the mobile station by using the allocated resource.

Thereafter, the procedure of FIG. 9 ends.

Figure 10:
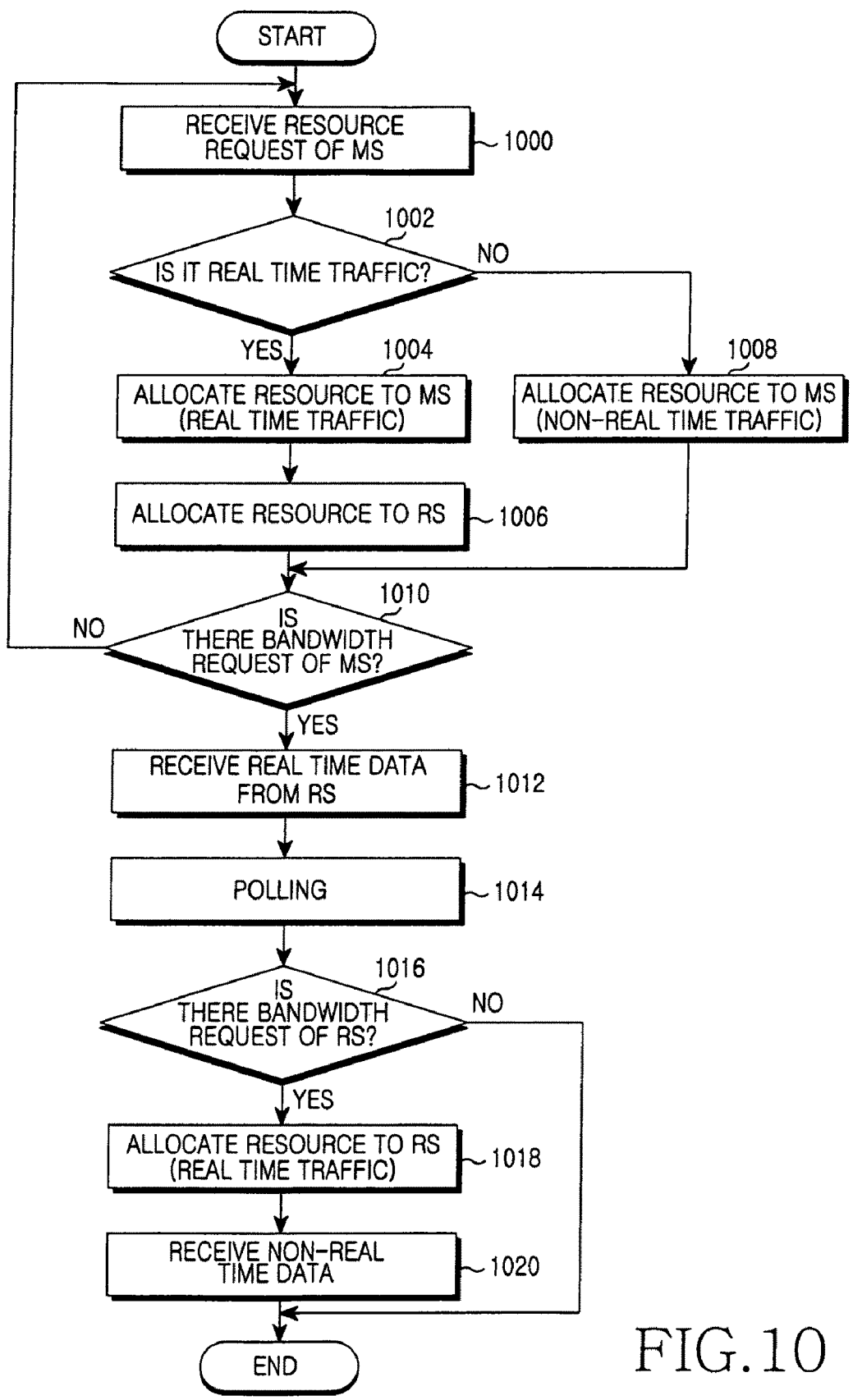
FIG. 10 is a flowchart illustrating an operation of a base station for UL radio resource allocation in a wideband wireless communication system according to a third embodiment of the present invention.

FIG. 10 is a flowchart illustrating an operation of a base station for UL radio resource allocation in a wideband wireless communication system according to the third embodiment of the present invention.

Referring to FIG. 10, the base station receives from a relay station a resource request message of a mobile station in step 1000.

In step 1002, the base station determines whether the received data is real time traffic. If the data is the real time traffic, the base station allocates a resource to the mobile station by using bandwidth request header information contained in the resource request message of the mobile station in step 1004. Likewise, in step 1006, the base station allocates a resource to the relay station by using the bandwidth request header information contained in the resource request message of the mobile station. In this case, the resource allocated to the relay station is equal to the resource allocated to the mobile station.

If the data is not the real time traffic, the base station allocates a resource only to the mobile station by using the bandwidth request header information contained in the resource request message of the mobile station in step 1008.

In step 1010, the base station determines whether there is no bandwidth request. If there is no bandwidth request, returning to step 1000, the base station receives from the relay station the resource request message of the mobile station. Otherwise, if there is a bandwidth request, the base station receives from the relay station the (real time traffic) data of the mobile station in step 1012.

In step 1014, the base station performs polling to check a status of the mobile station.

In step 1016, the base station determines whether there is no bandwidth request of the relay station. If there is a bandwidth request of the relay station, the base station allocates to the relay station a resource requested by the relay station in step 1018. If there is no bandwidth request of the relay station, the procedure of FIG. 10 ends.

In step 1020, the base station receives the non-real time traffic data from the relay station.

Thereafter, the procedure of FIG. 10 ends.

It will be assumed hereinafter in FIGS. 11A and 11B, FIGS. 12A, 12B and 12C, and FIGS. 13A, 13B and 13C that an MS1, an MS2, and an MS3 are registered to a relay station so that each mobile station can transmit data to a base station via the relay station.

Figure 11A:
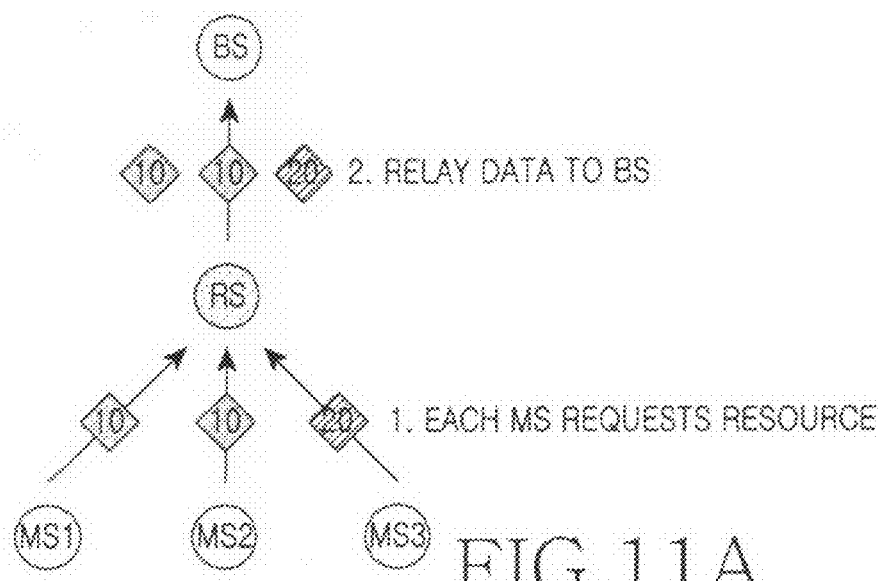
FIGS. 11A and 11B illustrate an example of UL radio resource allocation in a wideband wireless communication system according to a first embodiment of the present invention.
Figure 11B:
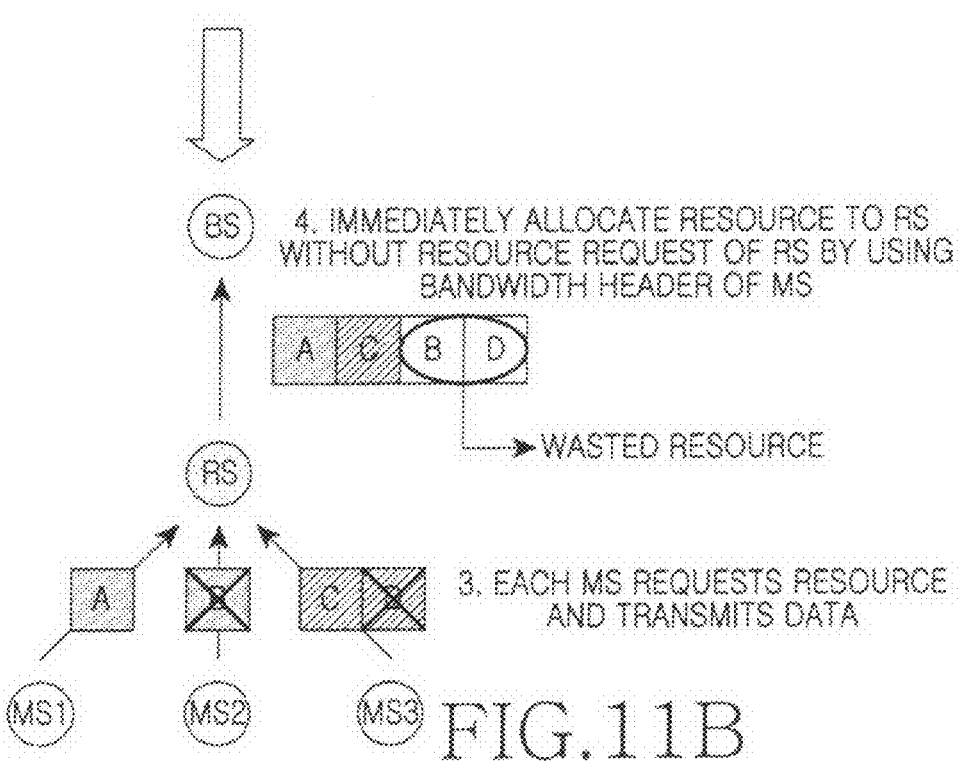

FIGS. 11A and 11B illustrate an example of UL radio resource allocation in a wideband wireless communication system according to the first embodiment of the present invention.

Referring to FIG. 11A, in an arbitrary number of frames, the MS1 and the MS2 each request a resource by an amount of 10 for rtPS traffic, and the MS3 requests a resource by an amount of 20 for nrtPS traffic. Upon receiving the resource request from the mobile stations, the base station allocates the resources by an amount of 10, 10, and 20, respectively, to the MS1, the MS2, and the MS3. Simultaneously, the base station also allocates the same amount of resources (i.e., 10, 10, and 20) requested by each mobile station to the relay station.

Referring to FIG. 11B, immediately after data is received from the mobile stations, the relay station relays the data to the base station by using the aforementioned amount of resources (i.e., 10, 10, and 20) allocated by the base station. Assume that one packet has a size of 10 (that is, the MS1 transmits a packet A, the MS2 transmits a packet B, and the MS3,transmits a packet C and a packet D). Then, in the case where resources are allocated to the relay station by the base station according to the first embodiment, if an error occurs in a link between the mobile station and the relay station similar to the case of the B packet and the D packet, waste of resources occurs since the resources have already been allocated to the relay station by the base station to relay the B packet and the D packet.

FIGS. 12A, 12B and 12C illustrate an example of UL radio resource allocation in a wideband wireless communication system according to the second embodiment of the present invention.

Referring to FIGS. 12A, 12B and 12C, in an arbitrary frame, when the MS1 and the MS2 each request a resource by an amount of 10 for rtPS traffic, and the MS3 requests a resource by an amount of 20 for nrtPS traffic, the relay station relays a bandwidth request header transmitted by the mobile stations to the base station, and the base station allocates the requested amount (i.e., 10, 10, and 20) of resources for transmitting UL data to the mobile stations.

Referring to FIG. 12B, the mobile stations transmit data to the relay station by using allocated resources. If a packet B which is rtPS traffic and is transmitted from the MS2 and a packet D which is nrtPS traffic and is transmitted from the MS3 have errors, the relay station inserts a packet A into an rtPS queue and a packet C into an nrtPS queue. Since the packet B and the packet D have erroneous data, the packets B and D are discarded instead of being stored in a queue of the relay station. The relay station stores data in its queue, and when the base station allows a chance to request resources, the relay station requests the resource by the same amount as successfully received data for each traffic type (i.e., packet A: 10 and packet C:10). The mobile stations each transmit the bandwidth request header to the base station through polling, and then the resources are allocated to the mobile stations. Likewise, the relay station requests the resources by using the polling. Since the relay station has successfully received rtPS traffic data by an amount of 10, when the relay station is polled by the base station for rtPS data transmission, the relay station requests the resources by transmitting the bandwidth request header to the base station. Further, when the relay station is polled by the base station to transmit nrtPS data, since the nrtPS data amounts to 10, the relay station requests the resources by transmitting a bandwidth request header of the relay station to the base station.

Referring to FIG. 12C, the relay station relays the packet A and the packet C, which are successfully received to the base station, by using the allocated resource.

Figure 13A:
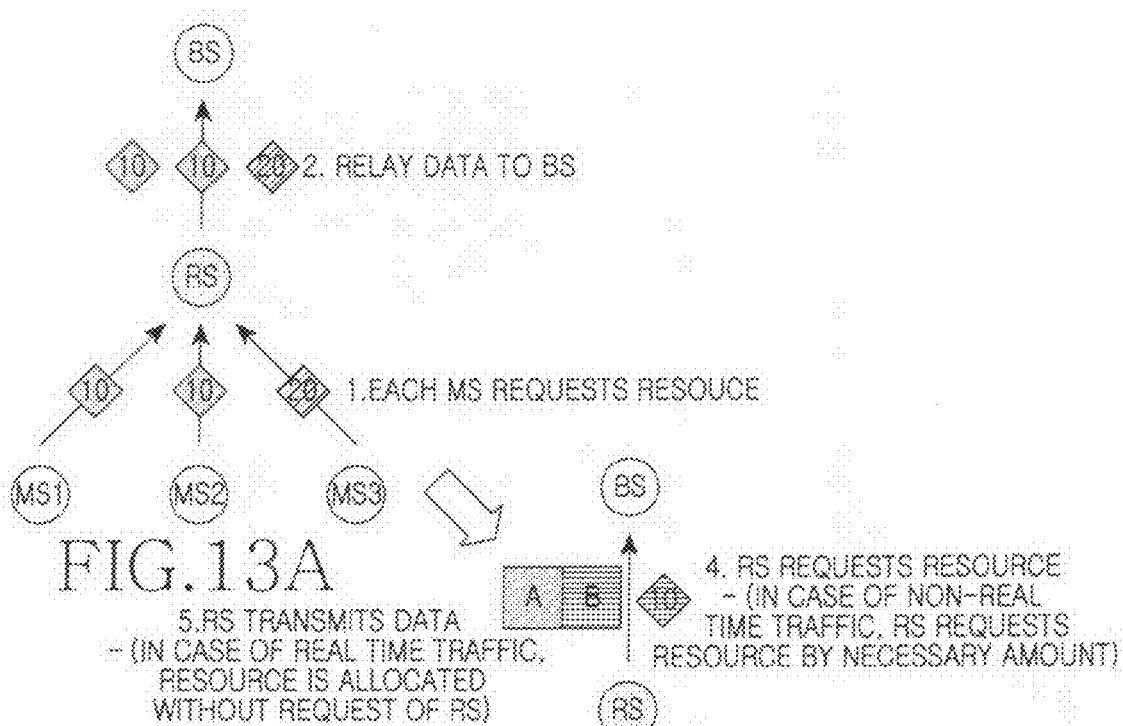
FIGS. 13A, 13B and 13C illustrate an example of UL radio resource allocation in a wideband wireless communication system according to a third embodiment of the present invention.
Figure 13B:
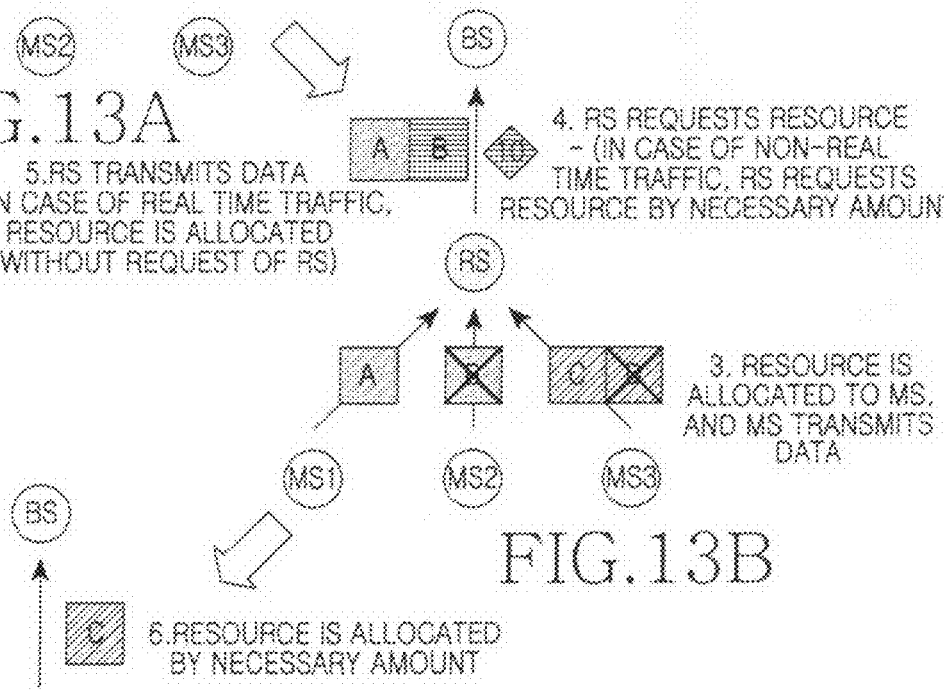
Figure 13C:
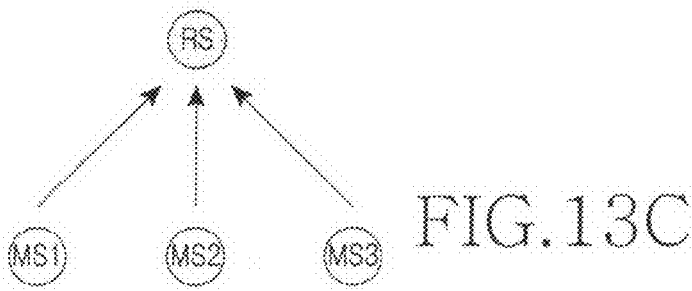

FIGS. 13A, 13B and 13C illustrate an example of UL radio resource allocation in a wideband wireless communication system according to the third embodiment of the present invention.

Referring to FIG. 13A, the MS1 and the MS2 each request a resource by an amount of 10 for rtPS traffic, and the MS3 requests a resource by an amount of 20 for nrtPS traffic. The rtPS traffic is to support a real time service, and the nrtPS traffic is to support a non-real time service. According to the third embodiment, the relay station discriminates the real time service and the non-real time service in a resource allocation process. Specifically, the relay station allows the mobile stations to relay the bandwidth request header to the base station. Then, upon receiving the resource request of the mobile stations, the base station allocates the resources to the mobile stations so that data can be transmitted to the relay station.

Referring to FIG. 13B, when the MS1 and the MS2 transmit rtPS data (i.e., real time traffic) to the base station, the base station allocates resources also to the relay station so that the mobile stations can transmit data to the relay station, and the relay station can relay the received data to the base station. In this case, the relay station does not queue the data received from the mobile stations nor requests the base station to allocate resources for data transmission. Therefore, for the real time traffic, the relay station transmits data to the base station immediately after the data is received from the mobile stations. Next, if it is assumed that the relay station is polled for the non-real time traffic in the same frame, the relay station does not immediately transmit the data as in the case of the real time traffic. Instead, the relay station calculates an amount of non-real time traffic received from the mobile station, and requests the base station to allocate a necessary amount of resource. For example, when the relay station receives a packet C and a packet D as the non-real time traffic from the MS3, if an error occurs in the packet C in a mobile station-RS link, an amount of a necessary packet to be requested is the same as that required to transmit the packet C. Therefore, the relay station requests the base station to allocate a resource by an amount of 10 for the non-real time traffic.

Referring to FIG. 13C, the relay station relays to the base station the packet C successfully received from the mobile station by using the allocated resources.

Figure 14:
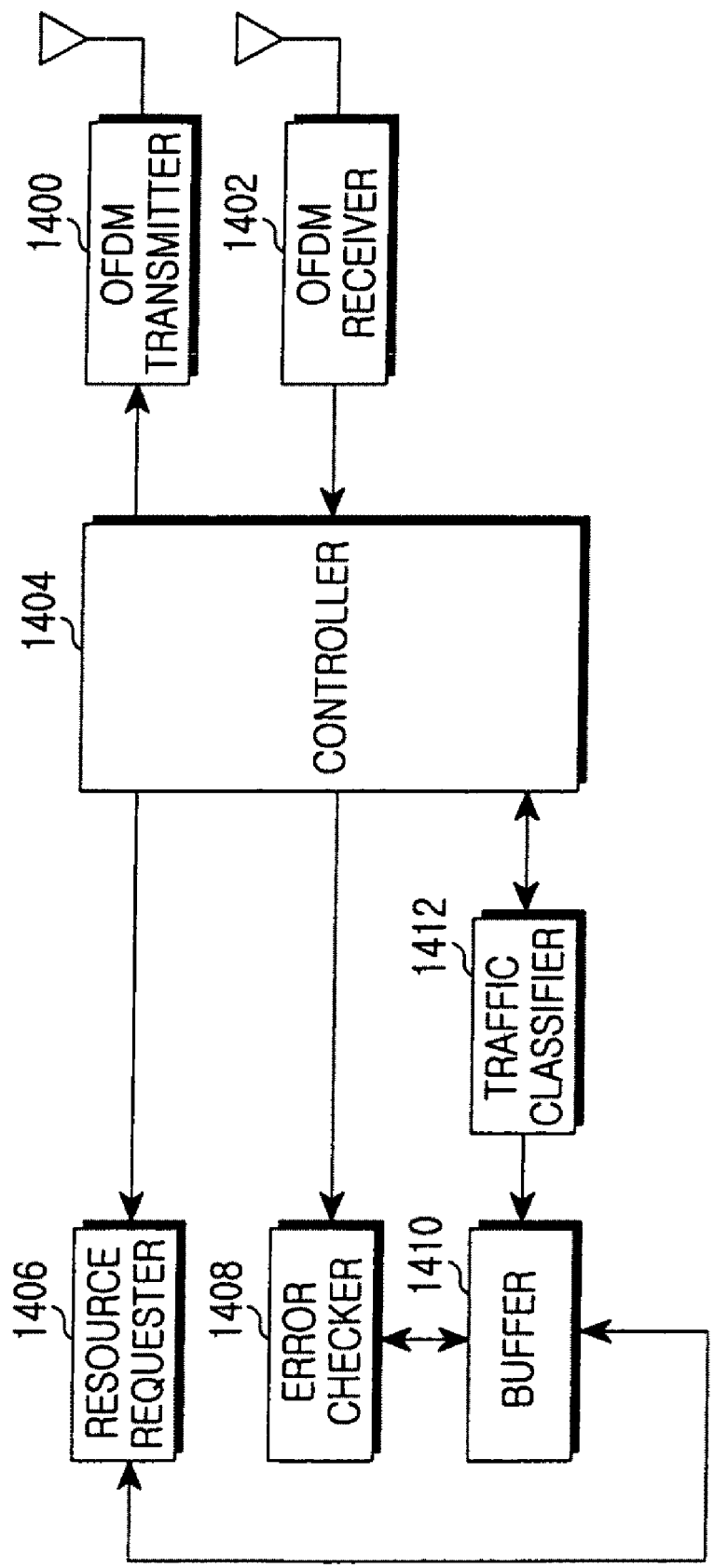
FIG. 14 is a block diagram of a relay station for UL radio resource allocation in a wideband wireless communication system according to an embodiment of the present invention.

FIG. 14 is a block diagram of a relay station for UL radio resource allocation in a wideband wireless communication system according to an embodiment of the present invention.

Referring to FIG. 14, the relay station includes an Orthogonal Frequency Division Multiplexing (OFDM) transmitter 1400, an OFDM receiver 1402, a controller 1404, a resource requester 1406, an error checker 1408, a buffer 1410, and a traffic classifier 1412.

The OFDM receiver 1402 converts a Radio Frequency (RF) signal received through an antenna into a baseband analog signal so as to output sample data, and then performs Fast Fourier Transform (FFT) on the sample data to output frequency-domain data. Further, the OFDM receiver 1402 selects data of sub-carriers to be received in practice from the frequency-domain data, demodulates and decodes the selected data according to a predetermined Modulation and Coding Scheme (MCS) level, and outputs the resultant data to the controller 1404.

The controller 1404 relays to a base station a resource request message received from a mobile station, outputs data received through the OFDM receiver 1402 to the traffic classifier 1412 and the error checker 1408, and informs the resource requester 1406 of the received data information.

The resource requester 1406 calculates a necessary resource by using information (i.e., information indicating real time traffic or non-real time traffic) on the data received from the controller 1404 and queue status information received from the buffer 1410, and reports the calculation result to the controller 1404.

The error checker 1408 checks if there is an error in the data received from the controller 1404, and reports the result to the buffer 1410. For example, the error checker 1408 may check the error by using parity check, block sum check, and Cycle Redundancy Check (CRC).

The traffic classifier 1412 classifies the data received from the controller 1404 distinctively according to a traffic type, and outputs the classified data to the buffer 1410. Example of the traffic type include the rtPS, the nrtPS, the ertPS, and the BE.

The buffer 1410 stores the data classified by the traffic classifier 1412 in a suitable buffer area. The buffer 1410 receives information for detecting an error in the data received from the error checker 1408, and stores only errorless data (i.e., successfully received data). That is, for each service traffic type, the buffer 1410 queues the data received from the controller 1404. For example, an rtPS queue, an nrtPS queue, an ertPS queue, and a BE queue are provided to store successfully received data.

The OFDM transmitter 1400 codes and modulates the data output from the controller 1404 according to a predetermined MCS level. Further, the OFDM transmitter 1400 performs Inverse FFT (IFFT) on the modulated data to output sample data (i.e., OFDM symbol), converts the sample data into an analog signal, converts the analog signal into an RF signal, and transmits the RF signal through an antenna.

In the structure of FIG. 14, the controller 1404 controls the resource requester 1406, the error checker 1408, the buffer 1410, and the traffic classifier 1412. That is, the controller 1404 can perform functions of the resource requester 1406, the error checker 1408, the buffer 1410, and the traffic classifier 1412. Although these elements are distinctively depicted in FIG. 14 for explanation purpose, the present invention is not limited thereto. Thus, either all or some of these elements may be controlled by the controller 1404 in practice.

Figure 15:
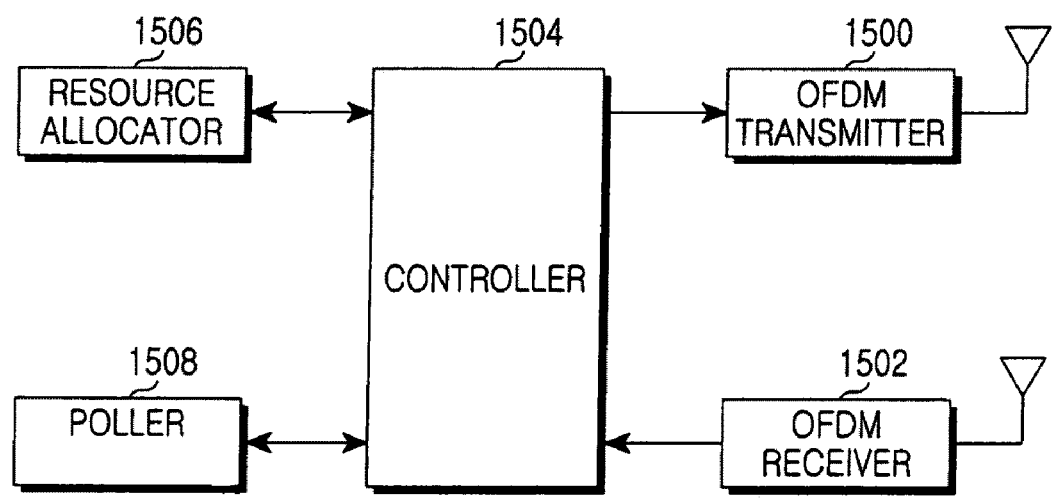
FIG. 15 is a block diagram of a base station for UL radio resource allocation in a wideband wireless communication system according to an embodiment of the present invention.

FIG. 15 is a block diagram of a base station for UL radio resource allocation in a wideband wireless communication system according to an embodiment of the present invention.

Referring to FIG. 15, the base station includes an OFDM transmitter 1500, an OFDM receiver 1502, a controller 1504, a resource allocator 1506, and a poller 1508. Since the OFDM transmitter 1500 and the OFDM receiver 1502 perform the same functions as the OFDM transmitter 1400 and the OFDM receiver 1402 of FIG. 14, details thereof will be omitted.

The controller 1504 receives from a relay station a resource request message of a mobile station, and controls the poller 1508 to provide information on a resource requested by the relay station to the resource allocator 1506.

In the case of real time traffic, the resource allocator 1506 uses a bandwidth request header information included in the resource request message to allocate a resource requested by the mobile station. During polling, the resource allocator 1506 receives from the relay station a resource request message of the relay station to allocate a resource to the relay station. In the case of the real time traffic, the resource allocator 1506 uses the bandwidth request header information contained in the resource request message of the mobile station to allocate resources to both the mobile station and the relay station.

The poller 1508 continuously checks a status of the relay station or the mobile station.

In the structure of FIG. 15, the controller 1504 controls the resource allocator 1506 and the poller 1508. That is, the controller 1504 can perform functions of the resource allocator 1506 and the poller 1508. Although these elements are distinctively depicted in FIG. 15 for explanation purpose, the present invention is not limited thereto. Thus, either all or some of these elements may be controlled by the controller 1504 in practice.

According to the present invention, a UL radio resource is allocated for multi-hop communications. Therefore, a delay can be reduced when the UL resource is allocated to a relay station for real time traffic. In addition, as for non-real time traffic, since the relay station requests a resource only when the relay station successfully receives data from a mobile station, waste of resources can be prevented, and a base station can further effectively perform resource management.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A relay station apparatus for UpLink (UL) radio resource allocation in a wideband wireless communication system, the apparatus comprising:
   a controller configured to relay to a base station a resource request message and receive data from one or more mobile stations;
   a traffic classifier configured to queue data received from the mobile stations according to a traffic type if the received data is a non-real time traffic; and
   a resource requester configured to request the base station to allocate necessary radio resources by checking a queue status when polling data is unicasted from the base station,
   wherein the received data in the queue is not buffered when the received data has an error.

2. The apparatus of claim 1, wherein the necessary radio resources are requested when a polling is performed by the base station.

3. The apparatus of claim 1, further comprising an error controller configured to not buffer the data in the queue when the data received from the mobile stations has an error.

4. The apparatus of claim 1, wherein the resource request message contains a bandwidth request header.

5. The apparatus of claim 1, wherein the controller relays to the base station the queued non-real time traffic data using the resources allocated by the base station.

6. The apparatus of claim 1, wherein, if the received data is a real time traffic, the controller transmits the data using a predetermined resource without a resource allocation request.

7. The apparatus of claim 1, wherein the traffic classifier determines whether the received data is the non-real time traffic or the real-time traffic.

8. A base station apparatus for UpLink (UL) radio resource allocation in a wideband wireless communication system, the apparatus comprising:
- a controller configured to receive from a relay station a MS-RS link resource request message of one or more mobile stations and to receive real time traffic data using RS-BS link resources allocated to the relay station; and
- a resource allocator configured to allocate the MS-RS link resources requested by the mobile stations to the mobile stations and to allocate the RS-BS link resources to the relay station,
- wherein the MS-RS link resources are not based on a polling data transmission,
- wherein the RS-BS link resources are allocated based on the polling data transmission in a non-real time traffic and the RS-BS link resources are determined without a resource request of the relay station in a real time traffic.

9. The apparatus of claim 8, wherein, after the resource request message is received, if the data is a non-real time traffic, the resource allocator allocates the resources requested by the mobile stations to the mobile stations using bandwidth request header information contained in the resource request message, and allocates the resources to the relay station by receiving a resource request message of the relay station from the relay station through a polling.

10. A relay station apparatus for UpLink (UL) radio resource allocation in a wideband wireless communication system, the apparatus comprising:
- a controller configured to receive data from one or more mobile stations;
- a traffic classifier configured to queue the data according to a traffic type, after receiving data from the mobile stations; and
- a resource requester configured to check a queue status and request the base station to allocate necessary radio resources using a polling data transmission,
- wherein the received data in the queue is not buffered when the received data has an error.

11. The apparatus of claim 10, wherein the necessary radio resources are requested when a polling is performed by the base station.

12. The apparatus of claim 10, further comprising an error checker configured to not buffer data in the queue when the data received from the mobile stations has an error.

13. The apparatus of claim 10, wherein the resource request message contains a bandwidth request header.

14. The apparatus of claim 10, wherein the controller receives the data from the mobile stations and relays the data to the base station using the allocated radio resources.

15. A base station apparatus for UpLink (UL) radio resource allocation in a wideband wireless communication system, the apparatus comprising:
- a controller configured to receive from a relay station a resource request message of one or more mobile stations; and
- a resource allocator configured to allocate a requested resource to the mobile stations using bandwidth request header information included in the resource request message,
- wherein the resource allocator receives from the relay station a second resource request message of the relay station when a oiling is performed, and allocates necessary resources to the relay station.

16. A relay station apparatus for UpLink (UL) radio resource allocation in a wideband wireless communication system, the apparatus comprising:
- a controller configured to relay to a base station a resource request message received from one or more mobile stations; and
- a resource allocator configured to allocate, by the base station, radio resources in a same amount as that allocated to the mobile stations, without a resource request.

17. The apparatus of claim 16, wherein the resource request message contains a bandwidth request header.

18. The apparatus of claim 16, wherein the controller receives data from the mobile stations and relays the data to the base station using the allocated radio resources.

19. A base station apparatus for UpLink (UL) radio resource allocation in a wideband wireless communication system, the apparatus comprising:
- a controller configured to receive from a relay station a resource request message of one or more mobile stations; and
- a resource allocator configured to allocate resources to the mobile stations and the relay station using bandwidth request header information included in the resource request message,
- wherein the resources for the mobile stations are not based on a polling data transmission,
- wherein the resources for the relay station are allocated based on the polling data transmission.

20. The apparatus of claim 19, wherein the resources allocated to the mobile station and the relay station are equal in amount.

* * * * *